United States Patent [19]

Antonsson

[11] Patent Number: 4,957,369
[45] Date of Patent: Sep. 18, 1990

[54] APPARATUS FOR MEASURING THREE-DIMENSIONAL SURFACE GEOMETRIES

[75] Inventor: Erik K. Antonsson, Pasadena, Calif.

[73] Assignee: California Institute of Technology, Pasadena, Calif.

[21] Appl. No.: 298,931

[22] Filed: Jan. 23, 1989

[51] Int. Cl.$^5$ .............................................. G01B 11/24
[52] U.S. Cl. ........................................ 356/376; 356/1
[58] Field of Search ........................... 356/1, 375, 376

[56] References Cited

U.S. PATENT DOCUMENTS 4,534,650 8/1985 Clerget et al. ...................... 356/376

OTHER PUBLICATIONS

"Noncontact Visual Three-Dimensional Ranging Devices" by Takeo Kanade and Haruhiko Asada of Robotics Institute, Carnegie-Mellon University, Pittsburgh, Pennsylvania published in the SPIE vol. 283 '3-D Machine Perception' 1981, pp. 48 through 53.

"Laser Electro-Optic System for Rapid Three-Dimensional (3-D) Topographic Mapping of Surfaces" by Altschuler, Altschuler and Taboada published in vol. 20, No. 6 of 'Optical Engineering', Nov./Dec. 1981 pp. 953 through 961.

"Gait Analysis-Precise, Rapid, Automatic, 3-D Position and Orientation Kinematics and Dynamics" by Robert W. Mann and Erik K. Antonsson in vol. 43, No. 2 of the 'Bulletin of the Hospital for Joint Diseases Orthopaedic Institute', published in 1983 at pp. 137 through 146.

"A New Semiconductor Photocell Using Lateral Photoeffect" by J. Torkel Wallmark, Proceedings of the IRE 45:474-484 1957.

Primary Examiner—F. L. Evans
Attorney, Agent, or Firm—Leonard Tachner

[57] ABSTRACT

Automatic acquistion and anaylsis for three-dimensional surface geometries is accomplished by use of an opto-electronic technique which exploits large-linear-area lateral-photo-effect-diodes and employs a reflected, tightly focused light spot. The technique consists of one very small light spot pulsed for example at 10,000 Hertz with a 50% duty cycle. The light spot is focused on the surface to be measured and scanned across it stopping for, in one example, 50 microseconds each time it is illuminated. The diode detectors mounted in the focal plane of a pair of cameras, return azimuth and elevation information for each spot. Knowledge of the location and orientation of the cameras, as well as calibration corrections for each camera, completes the information necessary to reconstruct the full three-dimensional location of each reflected light spot.

19 Claims, 4 Drawing Sheets

APPARATUS FOR MEASURING THREE-DIMENSIONAL SURFACE GEOMETRIES

ORIGIN OF INVENTION

The invention described herein was made in the performance of work under a National Science Foundation grant No. CDR-8717322 and is subject to the provisions of Public Law 96-517 (35 USC 202) in which the Contractor has elected to retain title.

TECHNICAL FIELD

The present invention relates generally to the measurement of surface geometry (shape) such as the surface geometries of fabricated parts, machined surfaces, biological surfaces and deformed parts. More specifically, the present invention relates to an automatic high precision surface geometry measurement system which uses an opto-electronic technique based on lateral-photo-effect diode detectors.

BACKGROUND ART

Three-dimensional surface geometry acquisition is an important area of research for a wide variety of micro and macroscopic three-dimensional surface geometries. Several classes of problems are well solved, such as long distance landscape measurement via radar and earth surface elevation via satellite laser altimeters. However the problem of accurately determining the surface geometry of a numerically machined part for example is not well-solved. Contemporary techniques include the use of television cameras to determine silhouettes of a rotating part. Other techniques involve mechanical profilometers with stylii in contact with the surface. A number of three-dimensional surface geometry measurement systems have been proposed in the prior art. By way of example, in an article entitled "Noncontact Visual Three-Dimensional Ranging Devices", Takeo Kanade and Haruhiko Asada of the Robotics Institute Carnegie-Mellon University, Pittsburgh, Pa., published in the SPIE Volume 283 "3-D Machine Perception" 1981 at pages 48 through 53, disclose a scanning laser-ranging device for measuring the three-dimensional shape of objects utilizing a mono-lens camera having a position sensor chip mounted at the focal plane of the camera. Unfortunately, in contrast to the system described herein, this prior art system requires very precise tracking of the position of the laser light-beam which adds to the complexity of the system and increases the possibility for error. Still another three-dimensional measurement system is disclosed in an article entitled "Laser Electro-Optic System For Rapid Three-Dimensional (3-D) Topographic Mapping Of Surfaces" by Altschuler, Altschuler and Taboada published in Volume 20, No. 6 of Optical Engineering, November/December 1981 at pages 953 through 961. Unfortunately, this system uses one or more video cameras which must be synchronized with patterns generated by the electro-optic device. This system therefore also suffers from increased complexity and limited speed.

Perhaps the most relevant prior art is that disclosed in an article entitled "Gait Analysis-Precise, Rapid, Automatic, 3-D Position and Orientation Kinematics and Dynamics" by Robert W. Mann and Erik K. Antonsson in Volume 43, No. 2 of the *Bulletin of the Hospital for Joint Diseases Orthopaedic Institute,* published in 1983 at pages 137 through 146. This article discloses the use of an automatic opto-electronic photogrammetric technique for measuring spatial kinematics of human motion by placing a plurality of infrared, light emitting diodes on a subject whose movement patterns are to be analyzed. This article describes a system which, like the present invention, uses a pair of passive calibrated cameras each having a large-linear-area lateral-photo-effect-diode detector to provide data regarding the changing position of the various light-emitting diodes on the subject. Unfortunately, three-dimensional measurement of the surface geometry of a passive object is a more complex problem which does not permit the use of light sources on known locations on the object in the manner described in the aforementioned article.

There has therefore been a long-felt need both in industry and academia for a three-dimensional surface geometry measurement and analysis system and which does not require the precise real-time measurement of the position of a light source with respect to the object being measured and furthermore, which does not require the use of active light sources at the surface being analyzed during the measurement.

SUMMARY OF THE INVENTION

Automatic acquisition and analysis for three-dimensional surface geometries is accomplished in the present invention by use of an opto-electronic technique which exploits large-linear-area lateral-photo-effect-diodes and employs a reflected, tightly focused light spot. The technique consists of one very small light spot pulsed for example at 10,000 Hertz with a 50% duty cycle. The light spot, by way of example, might be 10 microns or less in diameter. The light spot is focused on the surface to be measured and scanned across it stopping for, in one example, 50 microseconds each time it is illuminated. The diode detectors mounted in the focal plane of a pair of cameras, return azimuth and elevation information for each spot. Knowledge of the location and orientation of the cameras, as well as calibration corrections for each camera, completes the information necessary to reconstruct the full three-dimensional location of each reflected light spot. The detectors used have a resolution of 12 bits (1 part in 4096) producing for example, accuracies on the order of 10 microns in a 4 centimeter by 4 centimeter area or 0.1 millimeters in 4 meter by 4 meter area depending on the camera separation.

This system solves the stereo-correlation problem in real-time by utilizing detectors sensitive only to the position of a single light spot and illuminating one spot on the object at a time. The preferred embodiment of this system produces data on 10,000 spots per second. Thus an area 4 centimeters by 4 centimeters can be represented by a hundred by a hundred points with a grid spacing of 400 microns and each spot can be resolved to within 10 microns in all three dimensions in one second.

While a preferred embodiment of the present invention disclosed herein utilizes one laser diode light source and a pair of stationary cameras, it will be understood that the present invention may also be implemented using more than one laser light source and more than one pair of such cameras. The invention could, for example, be implemented by employing time or frequency multiplexing in the measurement process or by using what could be termed spatial multiplexing by having each side of the object being analyzed by two separate systems of the present invention simultaneously.

OBJECTS OF THE INVENTION

It is therefore a principal object of the present invention to provide an apparatus for making three-dimensional surface geometry measurements such as for use in manufactured part dimensional inspection, failed part geometry determination, existing part geometry measurement and robot kinematics measurement and vision (and other tasks where determining the three-dimensional locations of selected points on an object is required) by using a flying light spot scanning technique in association with stationary calibrated cameras using large-linear-area lateral-photo-effect-diodes, but without requiring precise real-time knowledge of the position of the scanning light source relative to the object.

It is an additional object of the present invention to provide a three-dimensional surface geometry measurement apparatus which reduces the complexity and data processing requirements of the prior art and which employs stationary calibrated large-linear-area lateral-photo-effect-diodes, thereby making the measurement system high speed and accurate as compared to the prior art.

It is still an additional object of the present invention to provide a high resolution three-dimensional surface geometry measurement system which uses a flying spot scanning technique, but without requiring precise real-time knowledge of the position of the scanned light-beam while providing extremely accurate grid spacing of measurements such as 400 microns in a 4 by 4 centimeter area in a system that can produce data on 10,000 spots per second to provide a spot resolution of 10 microns in all three dimensions.

BRIEF DESCRIPTION OF THE DRAWINGS

The aforementioned objects and advantages of the present invention, as well as additional objects and advantages thereof, will be more fully understood hereinafter as a result of a detailed description of a preferred embodiment when taken in conjunction with the following drawings in which.

DETAILED DESCRIPTION OF A PREFERRED EMBODIMENT

Automatic acquisition and analysis of three-dimensional surface geometries are accomplished in the present invention by means of an opto-electronic technique exploiting large-linear-area lateral-photo-effect diodes and a reflected, tightly focused light spot. This light spot is focused on the surface to be measured and scanned across it, stopping for a preselected short period of time each time it is illuminated. The diode detectors mounted in the focal plane of a camera, return azimuth and elevation information for each spot. Knowledge of the location and orientation of a pair of cameras and calibration corrections for each camera, complete the information necessary to reconstruct the full three-dimensional location of each reflected light spot.

Figure 1:
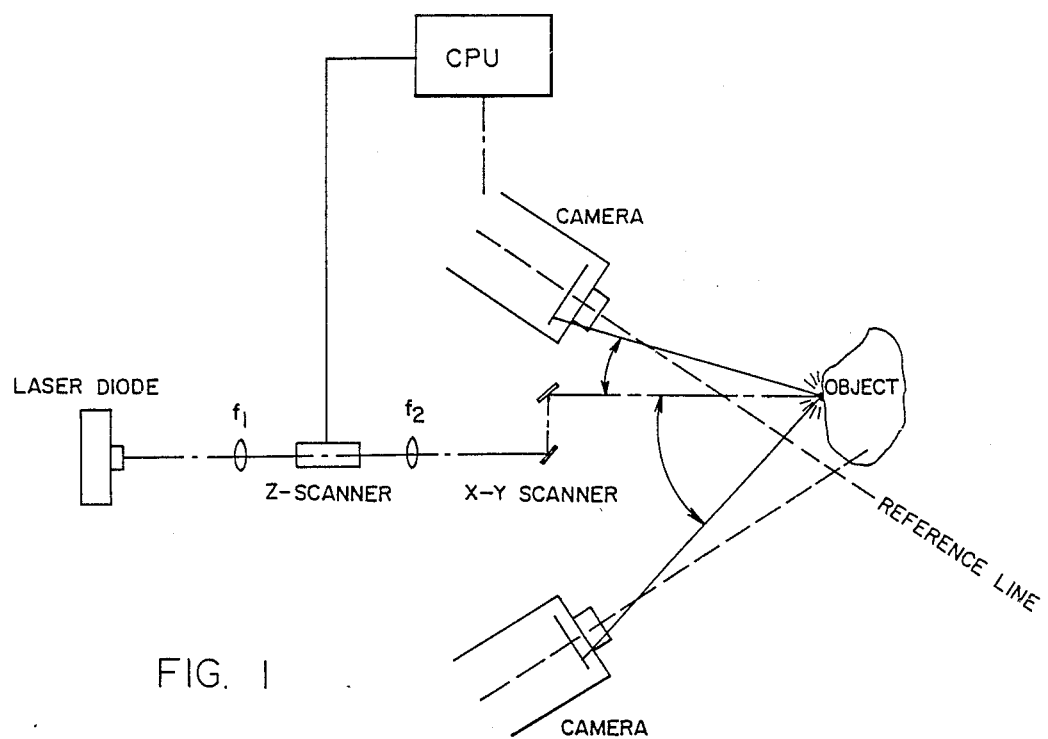
FIG. 1 is a block diagram representation of the three-dimensional surface geometry measurement system of the present invention.
Figure 2:
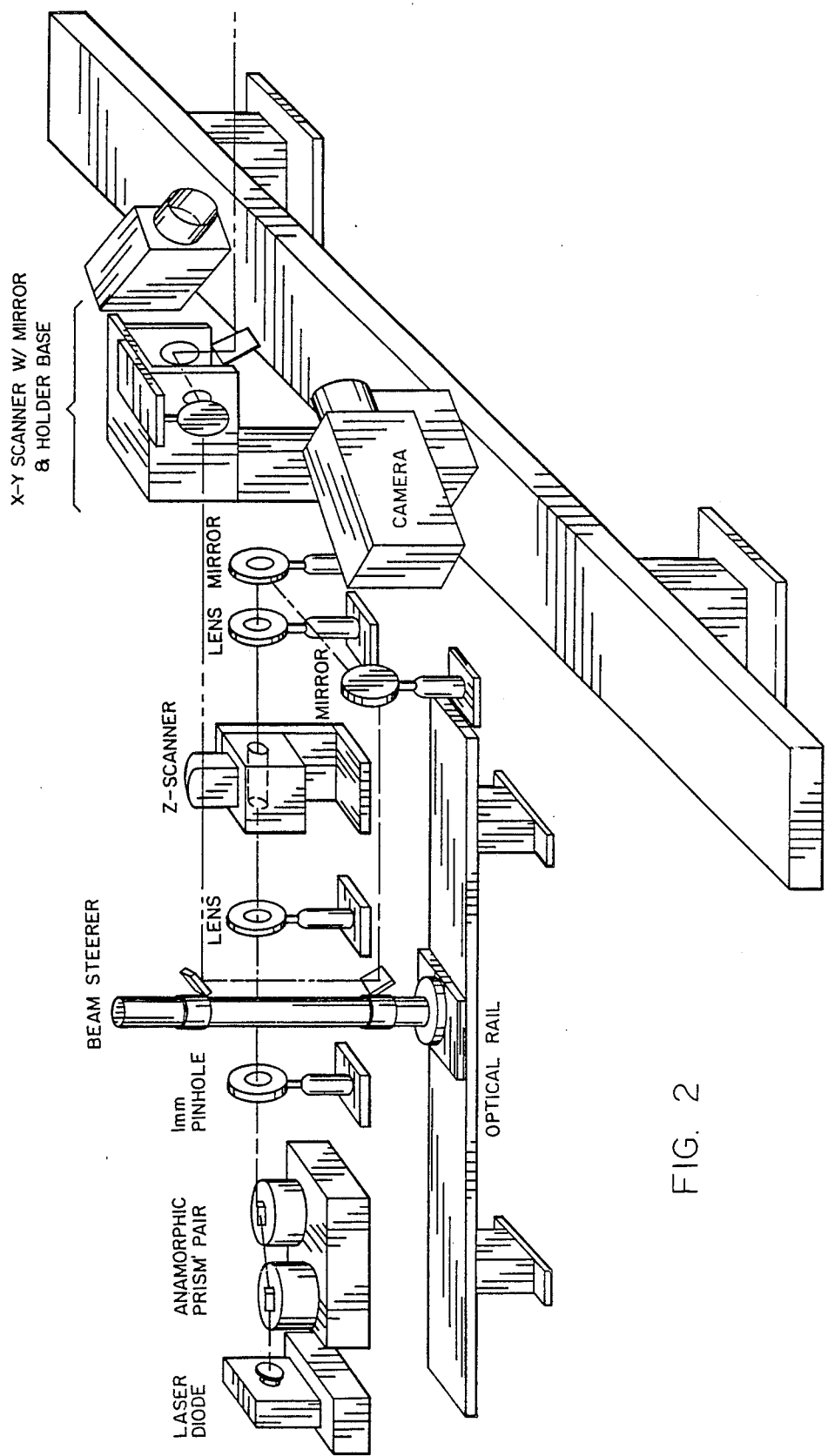
FIG. 2 is a three-dimensional representation of the optical portions of the present invention.

The present invention solves the stereo correlation problem in real-time by utilizing detector sensitive only to the position of a light spot and illuminating one spot in the scene at a time. This selective illumination is achieved under normal lighting by using an infrared laser diode and common mode rejection of background illumination. FIGS. 1 and 2 illustrate generally the major components of the present invention shown in the process of measuring the three-dimensional shape of an object. As seen in FIG. 1, the invention comprises a laser diode light source, optical elements including a Z axis scanner and a X and Y axis scanner, a pair of large-linear-area photo-effect-diode cameras and a computer referred to in FIG. 1 as a CPU.

In the preferred embodiment of the invention that has been reduced to practice, the laser diode being used is a Diolite 800—40 40mW Diode Laser System that produces an infrared beam with a wavelength of 830 nm to 850 nm. The output beam of the Diolite 800—40 laser diode is elliptically-shaped. Accordingly, as seen in FIG. 2, a pair of anamorphic prisms are used to convert the beam to a circular shape. In addition, the diameter of the beam is controlled by using a 1 millimeter hole aperture device in front of the anamorphic prism pair. The beam is then directed to the Z scanner optics which comprises a pair of fixed lenses on each side of a middle lens. The middle lens is adapted to move in the Z direction up to 20 millimeters by means of a LT1320 13mm Pupil Z Scanning Head and a DX-1000 Digital Driver manufactured by General Scanning, Inc. of Watertown, Mass.

The purpose of the Z axis optics is to provide a focused spot size of approximately 10 microns alterable by as much as 50 percent as the surface depth of the object changes up to 200 millimeters. This is accomplished in the Z axis optics of the present invention by using lenses to compensate for the change that takes place in spot size when the point on the object upon which the focused light spot falls, changes by as much as 200 millimeters. This objective is achieved in the Z axis scanning optics of the present invention by using an input lens having a focal length of 25 millimeters, an output lens having a focal length of 120 millimeters and a movable lens having a focal length of 10 millimeters. In addition, the spacing between the input lens and the nominal position of the movable lens is set at 250 millimeters and the distance between the output lens and the nominal position of the movable lens is set at 160 millimeters. With this embodiment of the scanner optics, it has been found possible to alter the focal point in the Z direction by approximately 250 millimeters with a 10 millimeter shift in the position of the movable lens while limiting the change in spot size to less than 50 percent.

As seen further in FIG. 1, the light-beam passing through the Z scanner is applied to an XY scanner which alters the position of the focused spot of laser light on the object in the vertical and horizontal directions. As seen best in FIG. 2 in a preferred embodiment of the present invention, the light-beam passing through the Z scanner at the second lens F2 of FIG. 1, is applied to a pair of diagonally oriented mirrors to horizontally turn the laser beam 180 degrees and is then applied to a beam steerer which repositions the laser beam to a different horizontal plane to accommodate the height of the XY scanner. The beam steerer is provided with a pair of diagonally disposed mirrors to again reverse the beam through 180 degrees this time in a vertical plane.

The XY scanner comprises three mirrors, one of which is used to direct the laser beam into the internal structure of the scanner and two of which are responsible for the movement of the beam in a two dimension X-Y position array depending upon the angular orientation of the remaining two mirrors. One such XY scanner employed is a Model XY2030 20 mm Pupil XY Scanner Head and a DXZ103 digital driver also manufactured by General Scanning, Inc.

Figure 3:
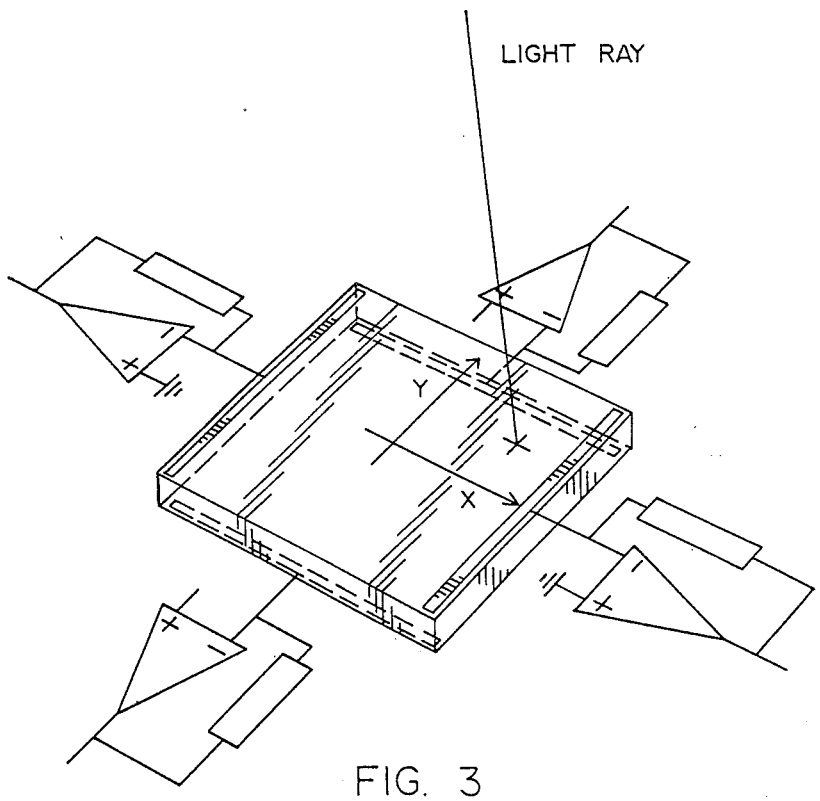
FIG. 3 is a schematic representation of the large-linear-area lateral-photo-effect-diode portions of the present invention.
Figure 4:
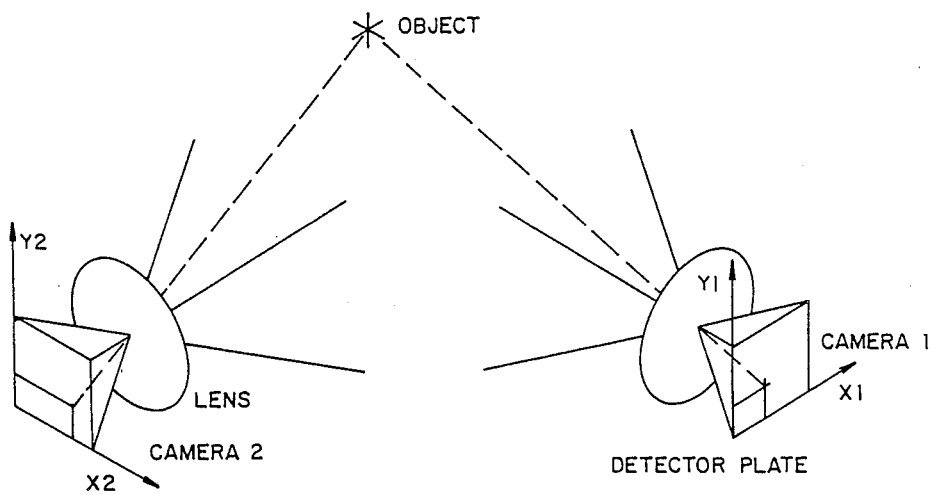
FIG. 4 illustrates in schematic form the lenses and detector plates of the cameras used in the present invention as well as two reconstructed rays from the light spot on an object being measured by the present invention.

As seen in FIGS. 1 and 2, there is a stationary camera positioned on each side of the XY scanner and oriented to point in the general direction of the object being measured. As seen in FIGS. 3 and 4, each of the cameras comprises a lens and a detector plate. Each such detector plate comprises a commercially available large-linear-area lateral-photo-effect diode system. The operation of the present invention is dependent upon the diode detectors which produce analog currents at their edges which are proportional to the location of the centroid of the light spot on the surface. These detectors are each a single monolithic sensor and not an array of discrete sensors.

The use of infrared light for the detection system permits normal illumination for the measurement space. Unusually dim or bright scenes are not necessary for the opto-electronic system of the present invention.

Additional information on lateral-photo-effect diodes can be found in a number of prior art references, including, by way of example, the proceedings of IRE 45:474-484 1957 in an article entitled A New Semiconductor Photo Cell Using Lateral Photo-Effect by Wallmark. One such detector plate connected for common mode rejection analog current output, is shown in FIG. 3. As seen therein, the diode surface is provided with a pair of current collection bars in each plane, X and Y. Those having skill in the art to which the present invention pertains, will understand that the current collected by each such bar in each such plane is inversely proportional to the distance between the position of the incident light spot and the current bars. Thus for example, in the illustration shown in FIG. 3, the incident light spot being closest to the current bar in the X axis in the lower right hand corner of FIG. 3, produces a larger analog current at the closer current bar and a smaller analog current at the more distance current bar for the X axis. The output of the current bars are connected to respective operational amplifier circuits and the relative magnitude and polarity of their combined outputs determines where in the X plane the light right is incident upon the detector. A similar circuit arrangement is provided for the Y plane and thus the output of the four operational amplifiers shown in FIG. 3 provides a precise indication, in two axes, of the position of the incident light spot.

As shown in FIG. 4, there is a suitable lens provided in front of each such detector plate to provide a focal length and optical geometry for the incoming light spots which are compatible with the detector plates. As also shown further in FIG. 4, the position of the light spot reflected at the object registers two distinct XY coordinates in the cameras, thereby providing a stereoscopic indication of the position of the light spot on the object in the manner to be described hereinafter below. A suitable spot position sensitive camera system is manufactured under the name "SELSPOT II" by Selspot of Troy, Mich.

The technique of employing azimuth and elevation or X and Y information from two vantage points is used for a variety of purposes including map making, range determination and geometrical measurements and is often performed on stationary targets using theodolites. Chapter 13 of Robot Vision by BKP Horn, the MIT Press, Cambridge, Mass., 1986, provides a basic introduction to photogrammetry and stereo. A more powerful technique developed for the present invention will now be described.

Figure 5:
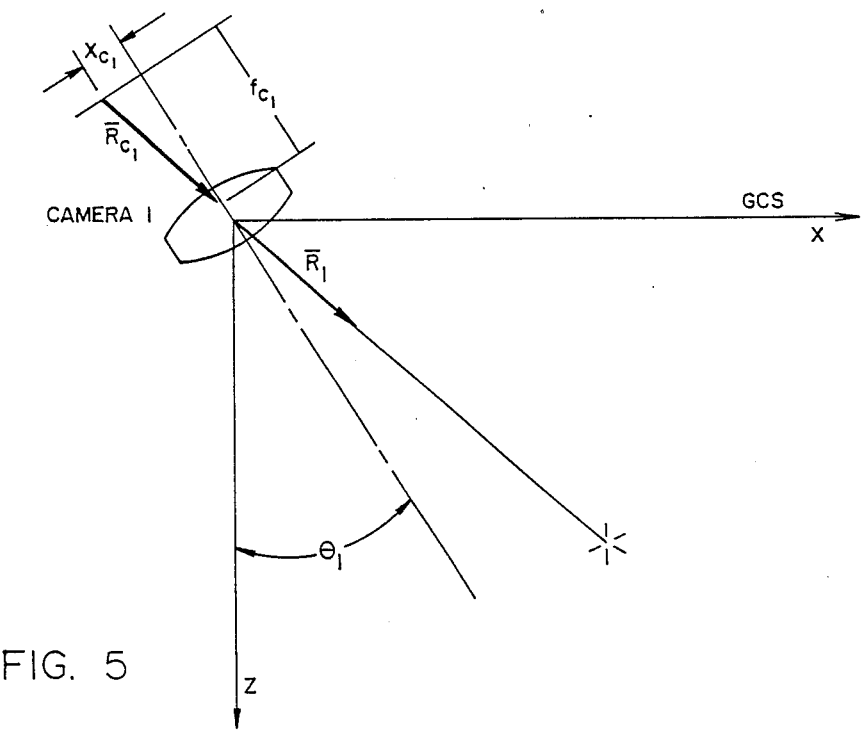
FIG. 5 is a plan view of one camera with data vectors in a global coordinate system illustrating a corresponding direction vector for a marker in the camera coordinate system.
Figure 6:
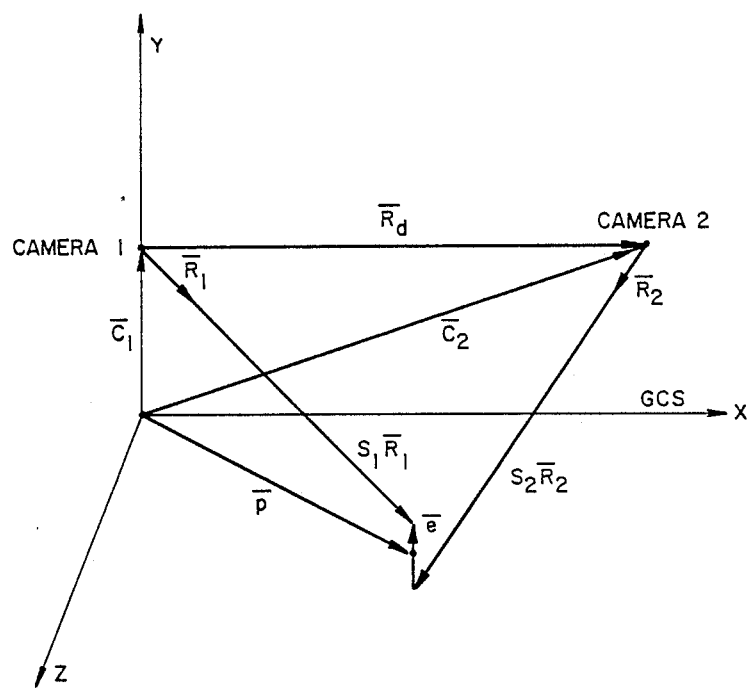
FIG. 6 illustrates the three-dimensional photogrammetric reconstruction technique and global coordinate system of the present invention.

The global coordinate system used in the present invention is depicted in FIG. 6. The technique used here to reconstruct the three-dimensional coordinates of the light spot on the object, makes use of all four camera data, namely, the azimuth and elevation angles from each of the two cameras to extract three spatial coordinates in the manner shown in FIG. 6. The vector p is from the origin of the global coordinate system (GCS) to the observed marker. $\vec{C}_1$ and $\vec{C}_2$ are the vectors from the global coordinate system to each cameras lens front node and: $\vec{R}_d = \vec{C}_2 - \vec{C}_1$ where $\vec{R}_1$ and $\vec{R}_2$ are the direction vectors measured from each camera's front lens node towards the observed light spot in the rotated camera coordinate systems, parallel to the GCS. FIG. 5 shows the direction vector for a marker in the camera coordinate system. $\vec{R}_{c1} = \{X_{c1}, Y_{c1}, f_{c1}\}$ T where $x_{c1}$ and $y_{c1}$ are the camera image plane coordinates for that maker and $f_{c1}$ is the distance from the rear mode of the lens to the image plane (in image plane discretization units). That same vector in the global coordinate system is found by rotating coordinate systems through the conversions angle $\theta$ of the camera, in this case, about the global Y axis (see FIG. 5). $\theta_1$ is the convergence angle for camera 1 and $\theta_2$ is the angle for camera 2 usually equal and opposite in sign. Normally, the extensions of $\vec{R}_1$ and $\vec{R}_2$ will not intersect exactly and as a result an error vector $\vec{e}$ is defined which connects the extensions of $\vec{R}_1$ and $\vec{R}_2$. Then: $\vec{R}_d + S_2\vec{R}_2 + e = S_1\vec{R}_1$ where the extension of the direction vector is the unknown scalar $S_1$ times $\vec{R}_1$ as in FIG. 6. The spatial location of the marker is assumed to be the midpoint of e where $S_1$ and $S_2$ are adjusted to minimize the length of $\vec{e}$. The scalars are found by solving for the length of $\vec{e}$. The scalars are found by solving for the length squared of $\vec{e}$ and then taking partials of $|\vec{e}|^2$ with respect to $S_1$ and $S_2$. $S_1$ and $S_2$ are then set to zero and the following two equations are solved:

$$S_1 = \frac{(\vec{R}_d \cdot \vec{R}_2)(\vec{R}_1 \cdot \vec{R}_2)(\vec{R}_d \cdot \vec{R}_1)(\vec{R}_2 \cdot \vec{R}_2)}{(\vec{R}_1 \cdot \vec{R}_1)(\vec{R}_2 \cdot \vec{R}_2)(\vec{R}_1 \cdot \vec{R}_2)(\vec{R}_1 \cdot \vec{R}_2)}$$

$$S_2 = \frac{(\vec{R}_d \cdot \vec{R}_2)(\vec{R}_1 \cdot \vec{R}_1)(\vec{R}_d \cdot \vec{R}_1)(\vec{R}_1 \cdot \vec{R}_2)}{(\vec{R}_1 \cdot \vec{R}_1)(\vec{R}_2 \cdot \vec{R}_2)(\vec{R}_1 \cdot \vec{R}_2)(\vec{R}_1 \cdot \vec{R}_2)}$$

then the vector $\vec{p}$ to the marker is:

$$\vec{p} = \vec{C_1} + \frac{1}{2}(S_1\vec{R_1} + \vec{R_d} + S_2\vec{R_2})$$

and the error vector $\vec{e}$, whose length is a measure of the skewness of the measured camera direction vectors, is:

$$\vec{e} = S_1\vec{R_1} - S_2\vec{R_2} - \vec{R_d}$$

Usual camera convergence angles are 26.57 degrees (arctan (0.5)) to produce approximately uniform spatial resolution throughout the viewing volume. However, it is clear from the discussion above, that the cameras can in principle be oriented arbitrarily as long as some of their fields of view intersect. Different angles will produce more unequal resolutions in each of the three Cartesian directions.

In the best of experimental circumstances, rays reconstructed using detected data from two cameras will intersect at the spot location in space. Unfortunately, due to small remaining uncalibrated error, noise and reflections, they are frequently skew and miss slightly. Perfect optics will produce a linear relationship between spot location and the image plane and mark a location in an object plane. A perfect detector will produce a linear relationship between spot location and the resulting data. However, neither perfect optics nor perfect detectors exist and a calibration scheme must be undertaken to extract the full capability in the measurement system. The approach taken in this invention is to separate the calibration into two parts. Extrinsic parameters, namely, those having to do with global and relative camera locations and orientations, are one such part. Intrinsic parameters, namely, those having to do with a single camera's angle measurement accuracy, constitute the other such part. In the system of the present invention, the extrinsic parameters are determined by mounting the cameras to a precision optical bench. The intrinsic parameters are determined by a full field of view calibration of each camera performed separately. The full field calibration for a lateral-photo-effect-diode camera at the level of precision reported here is novel and the resulting data indicates the necessity of such a calibration to exploit the full capability of the invention.

Figure 7:
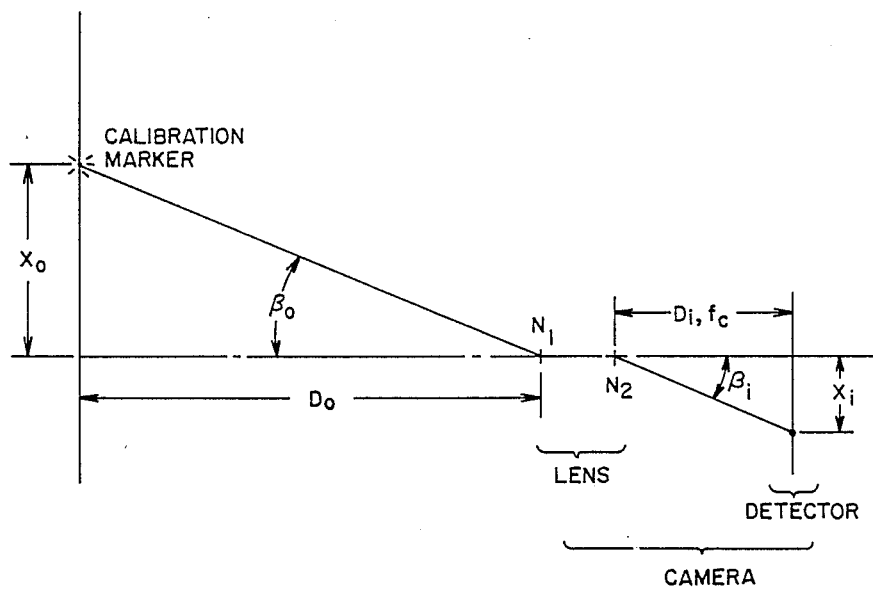
FIG. 7 illustrates a two-dimensional elevation cross-section of one camera and a portion of the measurement volume and a method of intrinsic calibration of a camera of the present invention.

A variety of methods exist for intrinsic and extrinsic calibration. FIG. 7 shows a two-dimensional elevation cross-section of one camera and a portion of the measurement volume. Both x and $\beta$ are representative in this discussion of either an azimuth or elevation angle. Each location in the image plane is characterized by location values, x and y with corresponding and $\beta$ elevation · One value and one angle are used here to simplify the description of the calibration technique as indicated by the two-dimensional cross-section in FIG. 7. In actual calibration, sets of both orthogonal data were collected and used.

The essential measurement that a camera makes during data collection is $\beta_i$ which is related by the calibration data to $\beta_o$ or the angle azimuth or elevation to the spot. During intrinsic calibration, the basic approach is to reverse this: $\beta_o$ is known and a relationship between x; the camera image plane position data and $\beta_i$ is determined. The steps are: independently measure $D_o$, the distance along the optical axis of the lens and detector from the lens front node to the calibration marker; then independently measure $x_o$, the distance from the optical axis to the calibration marker. From the above two data determine $\beta_o$ then collect $x_o$ from the camera and repeat for many points with different $x_o$ or different $D_o$ if desired. Finally determine an average $D_i$ ($f_c$) and determine the correction to apply to each $x_i$ to obtain the correct $\beta_i$ and hence $\beta_o$.

It is clear from FIG. 7 that the lens front node point ($N_i$) plays a special role in the calibration and use of photogrammetric cameras. In thick lens theory, the nodes are the two points on the optical axis of the lens that light rays appear to enter towards and leave from with equal angles. The intrinsic calibration of a camera can only be performed with correct knowledge of the physical location of at least one of the nodes because the calibration corrects to make the triangle $x_o$, $D_o$, $N_1$ similar to the triangle $x_i$, $D_i$, $N_2$.

The average $D_i$ value is used with $D_o$ to calculate an expected $x_i$ with each $x_o$ again based on the similarity of triangles $x_o$, $D_o$, $N_1$ and $x_i$, $D_i$, $N_2$. This expected value is compared to the measured $x_i$ value and the difference is the error. The negative of the error is the calibration correction for that point on the image plane. This, of course, can be done for both x and y and a map of errors for the detection system including the lens, the detector and associated electronics can be created.

The computer or CPU of FIG. 1 has in the present invention, three principal functions. First and foremost it is a function of the CPU of FIG. 1 to collect data and carry out the calculations based on the above indicated equations to compute the three coordinate position identification of each spot on the object, based upon the X and Y coordinates detected by each camera. In addition to solving the above equations to achieve the three-dimensional coordinates of each detected spot, the computer may also be programmed to include calibrated corrections such as those based on temperature sensors. The ambient air temperature surrounding the object and optics of the present invention may have some slight impact on the accuracy of the measurement.

The calculation referred to herein above, may either be carried out on the fly (which means in real-time) or can be done for data that has been stored in the computer after a portion or all of scanning has been completed. One of the advantages of making the calculations in real-time is that in that manner, the computer's calculation of the Z axis position of the spot of laser light on the object, can be used as an input to control the Z axis scanner for the next detected spot, thereby reducing the likelihood of having an incorrect Z axis focal point for the light on the object, which would decrease the precision of the measurement. In addition, by allowing the computer to perform the three-dimensional axis measurement in essentially real-time, the scanning behavior of the present invention can be altered in real-time to make the scanning pattern responsive to more interesting variations in the object shape. Thus for example, when the coordinates of a particular light spot have changed dramatically from the previously measured coordinates, indicating that an edge has been reached or some other particularly interesting geometrical portion of the object has been observed, the computer program can automatically cause the scanning behavior to dwell on the interesting spot. This technique provides more precise information with respect to such more interesting spots on the object.

Another feature of the computer in its function in conjunction with the present invention, is the adjustment of a rotary table holding the object to obtain different views during the measurement process. Although, the inclusion of a rotary table or other means for varying the orientation of the object to be measured by the present invention is optional and not to be deemed a limitation of the present invention, it may be desirable to provide such automatic control of the object's orientation relative to the laser light-beam and the cameras in order to enhance the measurement output of the present invention. This technique would minimize manual intervention for changing the objects orientation after each measurement is made. In that event, it may be desirable to provide an interface between the computer and the rotary table or other object-reorienting apparatus in order to accomplish this feature automatically.

It will now be understood that what has been disclosed herein comprises a system for accurately measuring the dimensions of a three-dimensional object by focusing a small pulsed spot of infrared light on the surface to be measured. The spot of interest is identified by two cameras by the timing of its pulses. Because only a single spot is being sensed by the cameras at one time, stereo triangulation is easily performed. The azimuth and elevation angles from each of the two cameras are determined and these four data are used in a photogrammetric scheme to determine the three-dimensional location of the light spot. The spot is moved to a new location of interest by a combination of a Z axis and an X and Y axis scanning optical system. Such scanning may be in accordance with a predetermined grid or may be responsive to a computer program designed to automatically alter the spot scanning pattern in order to increase the density of the data along especially "interesting" portions of the object. Each time the spot is moved to a new location, the measurements are repeated. The present invention has been reduced to practice in an embodiment which is capable of measuring 10,000 spots per second and resolving the position of the spot to 12 bits or 1 part in 4,096. Because the scanner can not operate at 10,000 Hertz, the real sampling rate will be somewhat lower. However, the slower scanning rate has a distinct advantage. Specifically, multiple samples can be collected from one spot, thereby increasing both the resolution and accuracy of the data. Preliminary experiments indicate that a factor of four to eight improvement can be achieved, which translates to a fifteen to sixteen bit level of data accuracy and resolution.

Accuracy equal to 12 to 15 bits of resolution is achieved by careful calibration of the angle measuring capabilities of each camera. This is currently being done with an optical goniometric cradle and rotary table. These devices are accurate to within 1000 of 1 degree. They are used to carefully aim each camera at a large number of well-known angles to a calibration spot. These data can be reduced to a look-up table to extract corrections for the sample data. The resolution of the detectors provides an accuracy on the order of 10 microns over a four centimeter square surface. The technique of the present invention consists of using one very small (10 micron diameter or less) light spot pulsed at 10,000 Hertz with a 50% duty cycle. This light spot is focused on the surface to be measured and scanned across it, stopping for fifty microseconds each time it is illuminated. A pair of cameras with large-linear-array lateral-photo-effect diodes in the focal planes, return the azimuth and elevation of the spot with respect to each camera. Knowledge of the camera location and orientation and calibration corrections for each camera, complete the information necessary to reconstruct the full three-dimensional location of each reflected light spot.

Those having skill in the art to which the present invention pertains will now, as a result of the applicant's teaching herein, perceive various modifications and additions which may be made to the invention. By way of example, the particular implementation for optically scanning an object with a laser beam controlling the beam in three dimensions to focus the light spot on the object may be readily altered. It may be preferable in certain circumstances to use a plurality of different light sources at the same wavelength to illuminate different portions of the object to obtain the best possible precision and accuracy in measuring the object's dimensions. Furthermore, it may be desirable to use multiple optical light sources having different wavelengths to be able to frequency multiplex simultaneous measurements of the object in order to speed the process of measurement. Furthermore, it may be desirable to utilize light sources having wavelengths other than those in the infrared region and as a result it may be desirable to use cameras capable of providing XY coordinate indications relative to a reference line that operate with other forms of detection techniques such as those which utilize a fine and densely packed matrix of independent detectors. Accordingly, all such modifications and additions which may be made to the present invention are deemed to be within the scope thereof which is to be limited only by the claims appended hereto.

I claim:

1. A three-dimensional measurement apparatus for accurately determining the precise geometric shape of an object; the apparatus comprising:
   a source of radiation;
   means for focusing a spot of said radiation onto said object;
   means for scanning said focussed spot of radiation over the surface of said object;
   a pair of detectors positioned relative to said object for receiving radiation reflected from said focussed spot on said object, each said detector providing electrical signals representing the instantaneous two-dimensional coordinates of said spot of radiation as received by each said detector;
   means for calculating the three-dimensional coordinates of said spot of radiation on said object from said electrical signals provided by said detectors; and
   said focussing means comprising a Z-axis optical scanner having a focal length that is continuously variable over a pre-selected range and driving means for varying said focal length within said range.

2. The apparatus recited in claim 1 wherein said radiation is laser generated light.

3. The apparatus recited in claim 2 wherein said light is infrared.

4. The apparatus recited in claim 1 wherein said means for scanning comprises an X-Y axis optical scanner for directing a narrow beam of said radiation in two dimensions over a pre-selected range and driving means for controlling said beam direction within said range.

5. A three-dimensional measurement apparatus for accurately determining the precise geometric shape of an object; the apparatus comprising:
   a source of radiation;
   means for focusing a spot of said radiation onto said object;

means for scanning said focussed spot of radiation over the surface of said object;

a pair of detectors positioned relative to said object for receiving radiation reflected from said focussed spot on said object, each said detector providing electrical signals representing the instantaneous two-dimensional coordinates of said spot of radiation as received by each said detector;

means for calculating the three-dimensional coordinates of said spot of radiation on said object from said electrical signals provided by said detectors; and each said detector comprising a large-linear-area lateral-photo-effect-diode.

6. The apparatus recited in claim 1 wherein said calculating means comprises a computer.

7. The apparatus recited in claim 6 wherein each such diode comprises a pair of opposing space current bars in each of two orthogonal planes of said diode for providing an analog current in each such plane, the magnitude of each said analog current being correlated to the corresponding location of said reflected radiation on said detector.

8. The apparatus recited in claim 7 wherein said current bars are electrically connected for common-mode rejection of analog currents resulting from ambient light.

9. A three-dimensional measurement apparatus for accurately determining the precise geometric shape of an object; the apparatus comprising:

a source of radiation;

means for focusing a spot of said radiation onto said object;

means for scanning said focussed spot of radiation over the surface of said object;

a pair of detectors positioned relative to said object for receiving radiation reflected from said focussed spot on said object, each said detector providing electrical signals representing the instantaneous two-dimensional coordinates of said spot of radiation as received by each said detector;

means for calculating the three-dimensional coordinates of said spot of radiation on said object from said electrical signals provided by said detectors; and an electrical interconnection between said focussing means and said calculating means for minimizing the size of said spot of radiation in accordance with the calculated coordinates of said spot of radiation.

10. The apparatus recited in claim 9 further comprising an electrical interconnection between said scanning means and said calculating means for directing the spot of radiation on said object in accordance with the calculated coordinates of said spot of radiation.

11. A three-dimensional measurement apparatus for accurately determining the precise geometric shape of an object; the apparatus comprising:

a source of radiation;

means for focusing a spot of said radiation onto said object;

means for scanning said focussed spot of radiation over the surface of said object;

a pair of detectors positioned relative to said object for receiving radiation reflected from said focussed spot on said object, each said detector providing electrical signals representing the instantaneous two-dimensional coordinates of said spot of radiation as received by each said detector;

means for calculating the three-dimensional coordinates of said spot of radiation on said object from said electrical signals provided by said detectors; and means controlling said source of radiation for turning said source off during said scanning, stopping said scanning at pre-selected intervals and turning said source on during said intervals whereby said calculating means provides a non-ambiguous calculation of said three-dimensional coordinates of said spot of radiation corresponding to each such interval.

12. The apparatus recited in claim 11 wherein each such detector further comprises a lens for directing said received reflected radiation onto a pre-selected planar area.

13. An apparatus for analyzing the shape of an object by determining the precise three-dimensional coordinates of numerous closely space points on the object; the apparatus comprising:

a source providing a pulsed beam of light;

a Z-axis scanner for focussing said beam onto said object;

an X-Y axis scanner for repositioning said beam onto said closely space points on the object;

a pair of stationary cameras pointed at said object and having detectors sensitive to said light for identifying respective two-dimensional coordinates of the intersection of said beam on said object; and means for mathematically converting the two sets to two-dimensional coordinates identified by the pair of cameras to a single set of three-dimensional coordinates of the intersection of said beam on said object.

14. The apparatus recited in claim 13 wherein said light is infrared.

15. The apparatus recited in claim 13 wherein said light-beam source is a laser.

16. The apparatus recited in claim 13 wherein said detectors each comprise a large-linear-area lateral-photo-effect-diode.

17. The apparatus recited in claim 13 wherein said converting means comprises a computer.

18. The apparatus recited in claim 13 wherein said z-axis scanner and said X-Y axis scanner are controlled by a computer.

19. The apparatus recited in claim 13 wherein the duty cycle of said pulsed beam of light is about 50% and wherein said beam of light is off during said repositioning of said beam and on during said identifying.

* * * * *